United States Patent [19]
Edwards et al.

[11] Patent Number: 5,999,663
[45] Date of Patent: Dec. 7, 1999

[54] IMAGING SYSTEM WITH SCALING/NORMALIZING

[75] Inventors: Daniel R. Edwards, Ypsilanti; George R. Reasoner, Jr., Tecumseh; Gerald R. Smith, Farmington, all of Mich.

[73] Assignee: Unisys Corporation, Blue Bell, Pa.

[21] Appl. No.: 08/300,666

[22] Filed: Sep. 2, 1994

[51] Int. Cl.$^6$ .................................................. G06K 9/36
[52] U.S. Cl. ............................................................ 382/298
[58] Field of Search .................................. 382/298, 232; 358/451; 345/127, 129

[56] References Cited

U.S. PATENT DOCUMENTS

| | | | |
|---|---|---|---|
| 4,907,284 | 3/1990 | Ohuchi | 382/298 |
| 5,001,575 | 3/1991 | Nakahara | 358/451 |
| 5,008,752 | 4/1991 | Van Nostrand | 358/451 |
| 5,020,115 | 5/1991 | Black | 358/451 |
| 5,140,648 | 8/1992 | Hackett et al. | 382/298 |
| 5,305,398 | 4/1994 | Klein et al. | 382/232 |

*Primary Examiner*—Andrew W. Johns
*Attorney, Agent, or Firm*—Rocco L. Adornato; Mark T. Starr; John J. McCormack

[57] ABSTRACT

An arrangement for extracting and processing image data to form an array of re-scaled pixel data, this arrangement being part of a Normalizer/Scaler stage in an image lift/processing system, and including: a scaler for storing N different selectible scaling algorithms; a scaler-output; an input for receiving scanned lines of pixel data and feeding it sequentially line-by-line, pixel-by-pixel to the scaler, the input including "scale factors" for selecting an algorithm; while the scaler includes a mapping stage for executing a two-dimensional mapping of adjacent pixel values and adjacent scanline values; this arrangement also including a command store for storing scaling algorithms, with a command register input for the scale factors. Preferably the scaler also includes a First ROM for storing pixel values at prescribed addresses; a Second ROM for similarly storing previous pixel values, being input in parallel with the First ROM; a Latch to which the ROMs are output; and a pixel Counter reset with each new scan line; with a "current pixel" value input to a prescribed address in the First ROM, along with a "pixel count" number from the Counter, plus an associated scale factor; with an Adder interposed between the ROMs and the Latch to execute addition mapping.

15 Claims, 10 Drawing Sheets

IMAGING SYSTEM WITH SCALING/NORMALIZING

BACKGROUND, FEATURES

Workers are aware of certain techniques for "scaling" image data. For instance, U.S. Pat. No. 5,305,398 to Klein, et al. (assigned in common herewith; issued Apr. 19, 1994) teaches a scaling processor to change the size of a captured image (digital electronic representation), with associated input means to indicate image size, pixel data, etc. (FIGS. 1A, 2A and 3A are taken from U.S. Pat. No. 5,305,398). Here, FIG. 1A shows an image processor 24 arranged to include a random access storage memory (RAM) 50, a 5×5×8 bit shift register window assembly 52, a document height detection subprocessor 54, an input/output controller, a normalization subprocessor 58, a background suppression subprocessor 60, a spot/void subprocessor 62, and a scaling subprocessor 64.

Specifically, the document height detection subprocessor 54 is coupled to the input/output controller 56 by signals on bus 66 and is further coupled to the storage RAM 50 and to window shift register window assembly by signals on bus 68. The input/output controller is coupled to the storage RAM 50 and to the shift window assembly 52 by signals on bus 70 while also being coupled to the subprocessors 58, 60, 62, and 64 by signals on bus 72.

The shift register window assembly is additionally coupled to storage RAM 50 by signals on bus 74 and is coupled to each of the subprocessors 58, 60, 62, and 64 by signals on bus 76. Additionally, the subprocessors 58, 60, 62, and 64 are coupled together by signals on bus 78 which represents a functional output associated therewith, while the document height detection subprocessor 54 produces a document height output on bus 80.

Input video data is coupled to the storage RAM 50 and to the input/output controller by signals on bus 82 while the input/output controller further has an input bus 84 which is coupled thereto and which contains externally placed parameter data and command inputs which may emanate from a host computer 28.

Image Processor 24 feeds an Image Storage Module, which is controlled by input from the document processor (e.g., a check sorter) and by associated Host Computer 28.

Generally, the normalization subprocessor 58 is used to correct image data defects associated with such things as a non-uniform photo-cell responsiveness of the camera system 11 or non-uniform document illumination across a segment of a document being scanned during the acquisition of input video data which is placed upon bus 82 by system 11.

The background suppression subprocessor 60 is used to eliminate unwanted scenic or patterned background information from the image of a scanned document, while retaining printed and written information with the image associated with signals on the bus 82. The background suppression subprocessor 60 provides for uniform background, increased image contrast, and increased image uniformity associated with the video data placed upon bus 82. The spot/void filtering subprocessor 62 is used to eliminate small white and dark anomalies which adversely affect the quality and compressibility of the image represented by signals on the bus 82, while the scaling subprocessor 64 allows the image to be scaled relative to the resolution of the image by using one of a plurality of algorithms. The document height detection subprocessor 54 finds the highest and lowest points of transition from the image of the document to the image of the background thusly finding or identifying the overall height of the document whose image is represented by signals on bus 82.

The input/output controller is used to receive externally placed commands and parameter data associated with the processing of the preprocessors 58, 60, 62, and 64 and is further used in the normalization function to allow a remotely located controller (i.e., host computer 28) to sample the input video signals upon the bus 82. The input/output controller, by means of signals on bus 72, selects one of the subprocessors 58, 60, 62, or 64 to be activated in response to external command inputs upon bus 84.

The shift register window assembly 52 is used as a repository for image pixel data and is used in the performance of the various functions associated with subprocessors 58, 60, 62, or 64. In a preferred version shift register window assembly 52 has a dimension of 5×5×8 bits, since each of the pixels associated with the video image upon the bus 82 is up to eight bits in length, and since the operations associated with the subprocessors 58, 60, 62, and 64 are performed upon a 5×5 pixel array.

FIG. 2A is a block diagram of the scaling subprocessor block 24 shown generally in FIG. 1A. Here, the scaling subprocessor block 64, which is used to modify the resolution of the image (i.e., by changing its dimension), contains a scanline counter 772 and a scaling processor 774. The counter 772 is coupled to an end-of-scan signal on bus 108 and generates a single count for every "end-of-scan" pulse that appears on bus 108, thereby producing (on bus 776) a running identification of the columns associated with the acquired image. Bus 776 is coupled to an input of scaling processor 774. Additionally, the scaling processor 774 is coupled to row count signals on bus 104 and to bus 76. Processor 774 uses the row counts, on bus 104, and column counts, on bus 776 to correctly place the position of each of the pixels within the acquired image. The scaling processor 774 (which may be located off the image processing chip) uses the column count and row count associated with signals on busses 776 and 104, respectively, to produce a scaled output.

Referring now to FIG. 3A, there is shown a flowchart 800 which details the operation of the scaling processor 774 which, in this embodiment, is microprocessor based. The initial step 802, of flowchart 800, is followed by step 804 which requires the scaling processor 774 to acquire the row and column counts of buses 776 and 104 respectively. Step 806 follows step 804 and requires the scaling processor 774 to select pixels of data from the RAM and shift window register assembly 50, 52, by bus 76, wherein these pixels are selected based upon the row in column counts on the buses 776 and 104 respectively.

Step 808 follows step 806 in which the scaling processor 774 processes the acquired pixels in a scaling usual manner and then outputs the processed data onto bus 809 (FIG. 2A) to an output multiplexer 148. In the preferred embodiment of this invention, the scaled output value associated with step 808 is a typical median scaled value of the selected pixels. This is proven to retain edge features better than standard averaging techniques. Step 808 is followed by step 804. This is, three columns (i.e., 440, 442, and 444) of pixels and three rows (i.e., 450, 452, and 454) are processed by processor 774 at any instant of time. Processor 774 then discards the center pixel 458 and defines four quadrants as being defined by pixels "$P_{42}$", "$P_{32}$", and "$P_{43}$"; "$P_{22}$", "$P_{32}$", and "$P_{23}$"; "$P_{23}$", "$P_{24}$", and "$P_{34}$"; and "$P_{43}$", "$P_{44}$", and "$P_{34}$" respectively. Each quadrant is then assigned a single gray-scale value defined as the median of the gray-scale value of the pixels within each quadrant. Processor 774 then outputs one gray-scale value per quadrant at a time. This median scaling technique has proven to yield substantially sharper images than many prior scaling techniques.

The foregoing may be understood as a "scaling-down" processor for receiving a first plurality of pixels associated with image data, each of these pixels having a gray-scale value associated therewith. This scaling processor comprises:

(a) input means for receiving the first plurality of pixels and for arranging these pixels into a first matrix; and (b) processor means, coupled to this input means, for creating a second matrix by deleting a center pixel of said first matrix and thereafter for creating a second plurality of pixels to be contained within this second matrix.

U.S. Pat. No. 5,305,398 may also be understood as teaching an image processing device for use with an array of pixel data arranged in rows and columns and corresponding to an image, this device comprising:

first input means for receiving scanned lines of pixel data;

second input means for receiving a signal indicating an "end of a scan line" from an image sensor that generated the pixel data;

memory means for storing the pixel data in a first matrix;

address generator means for generating an address for each pixel in a scan line;

counter means for identifying each of said end of scan line signals;

output means for providing information regarding each of said scanned lines of pixel data, each of said generated addresses, and said first matrix of pixel data; and scaling processor means coupled to the output means and operative to create a plurality of sub-matrices from the first matrix of pixel data, each said submatrix being centered about a center pixel, and to generate a second matrix of pixel data smaller than the first matrix by combining pixels in each of the plurality of sub-matrices in a predetermined manner to scale-down the image, this combination of pixels excluding the center pixel of each sub-matrix.

INVENTION

Unlike the foregoing (or similar arrangements for scaling image data), the subject "Mapping Scaler" is not microprocessor-based, performs a "mapping" (rather than simply implementing a scaling algorithm; e.g., like the ASIC of U.S. Pat. No. 5,305,398)—and so can do "asymmetric scaling", can store multiple algorithms while selecting one as needed (U.S. Pat. No. 5,305,398 can run only one set scaling algorithm).

As a result, certain advantages accrue: e.g., this "Mapping Scaler" provides more flexibility in storing, selecting, and running new and different scaling algorithms; new scaling algorithms, not currently stored, can be easily loaded by simply changing the circuit ROMs with no hardware changes required; this scaler can implement asymmetric scaling; and it is not microprocessor based.

With this mapping function any scaling algorithm that can be defined as a two-dimensional adjacent pixel/adjacent scanline can be run; also asymmetric scaling can be implemented. There is no reason why the scaling algorithm (or scaling scale) here needs to be identical for adjacent pixel (vs adjacent scanline) scaling.

Multiple algorithms can be stored and selected for use on an as-needed basis by a single instruction to the NS command register.

BRIEF DESCRIPTION OF THE DRAWINGS

For a more complete understanding of the present invention, relative to the advantages thereof, reference may be made to the following detailed description taken in conjunction with the accompanying drawings in which:

FIG. 1 is a block diagram of a Scaler (N/S) embodiment, while

DESCRIPTION OF PREFERRED EMBODIMENTS

The Scaler:

Following is the preferred theory for operating scaling circuits on our "Mapping Normalizer/Scaler (NS) boards ( e.g., see board in FIG. 5); such are preferably used in the JPEG imaging module of a document imager/processor (e.g., of the type contemplated in U.S. Pat. No. 5,305,398). Such a "Mapping Scaler" is shown in the block diagram of FIG. 1.

Figure 1:
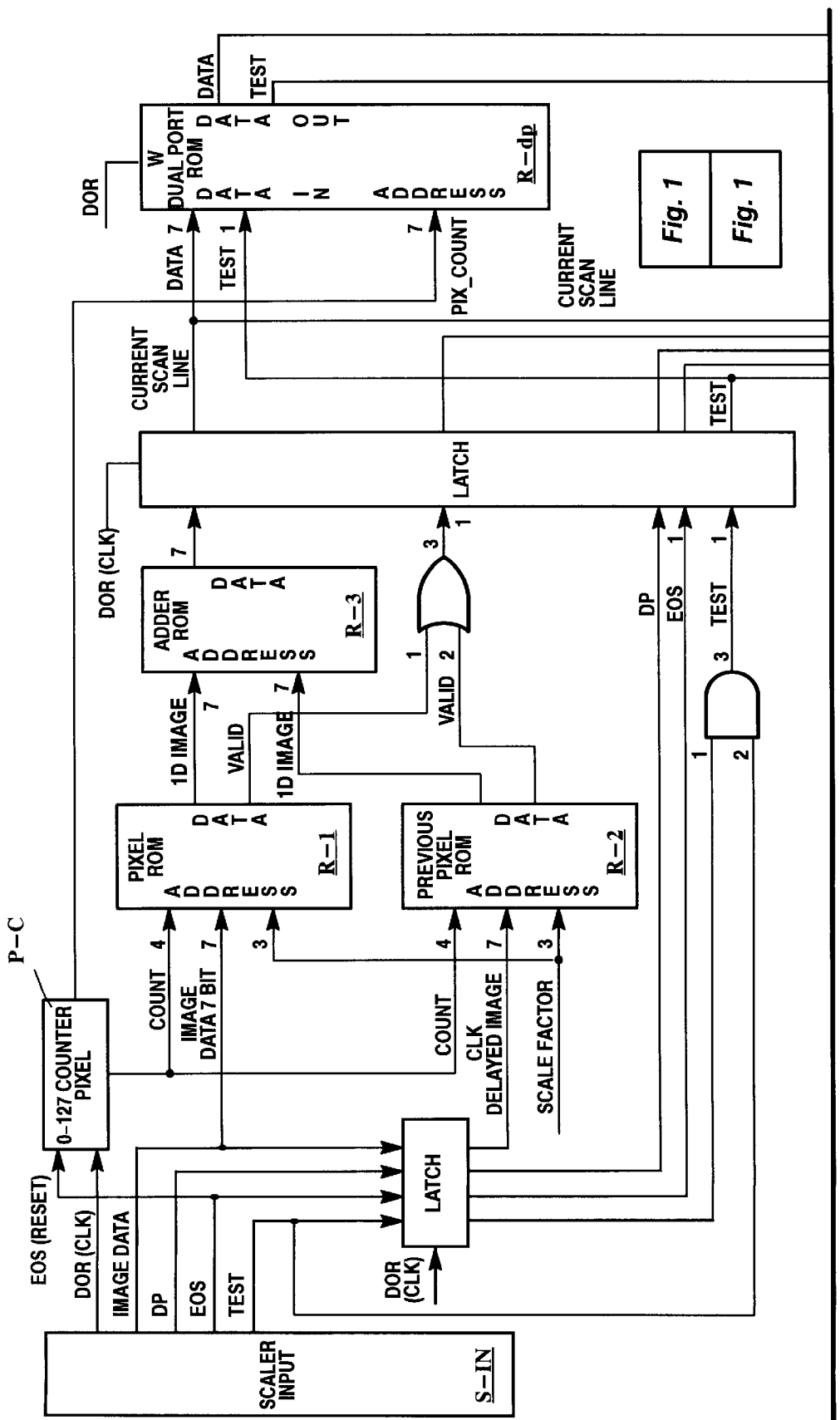
Figure 1:
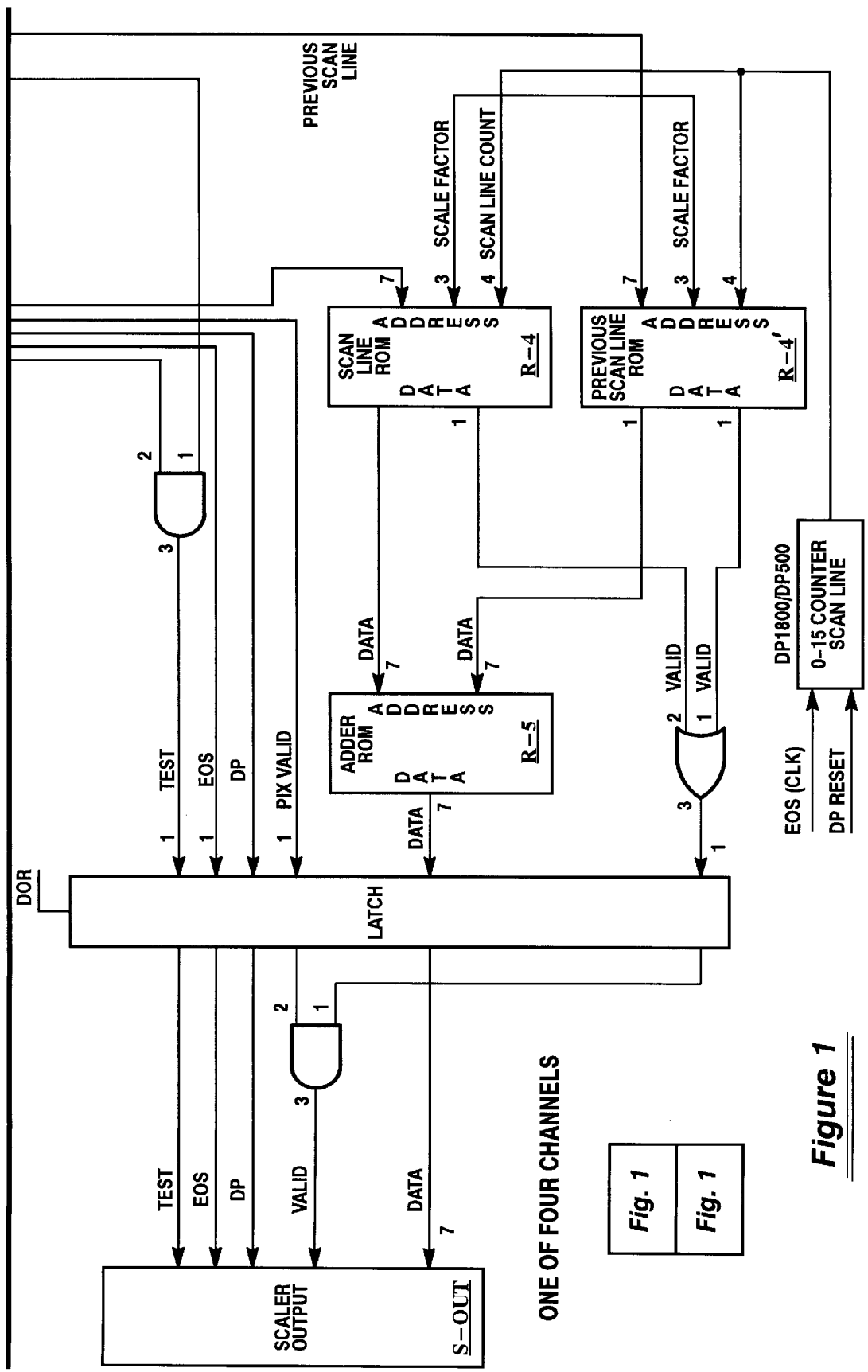
Figure 1A:
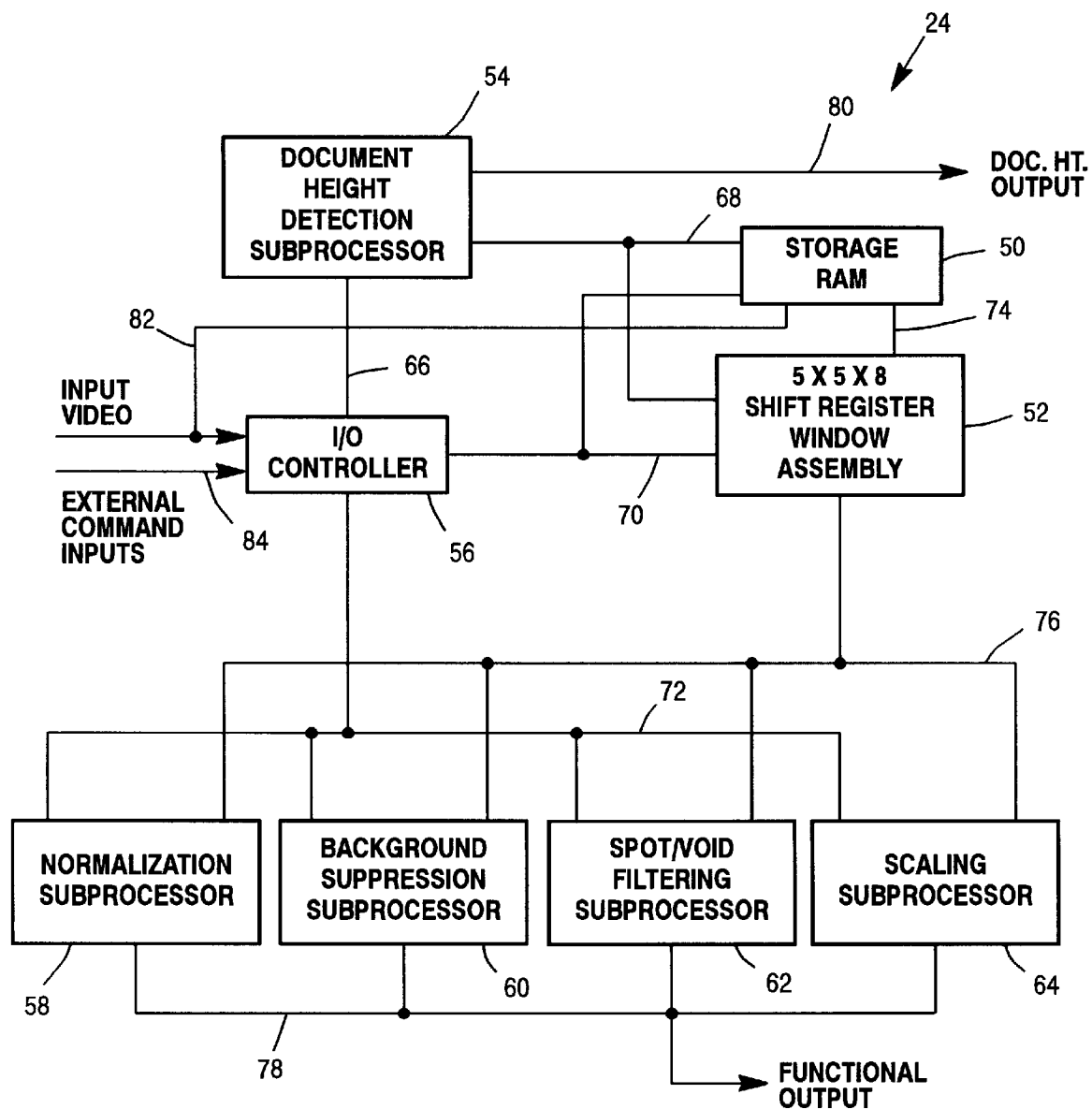
FIGS. 1A, 2A, 3A disclose prior art techniques, FIG. 1A showing an image processor array, FIG. 2A showing details of a scaling preprocessor portion thereof and FIG. 3A detailing process steps associated with FIG. 2A.
Figure 5:
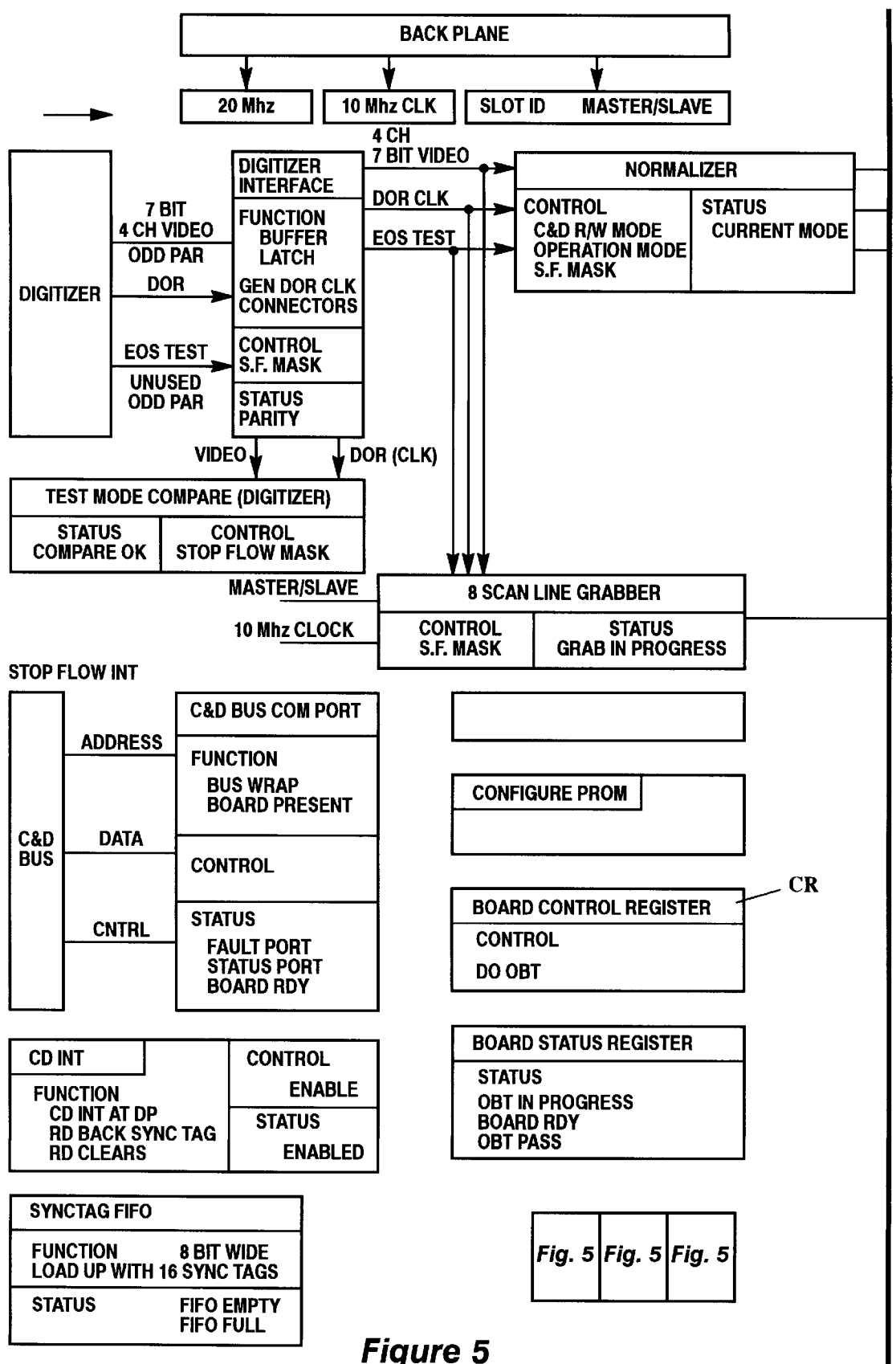
FIG. 5 is a like diagram of a complete N/S board embodiment, while FIG. 4 gives related image channel data.
Figure 5:
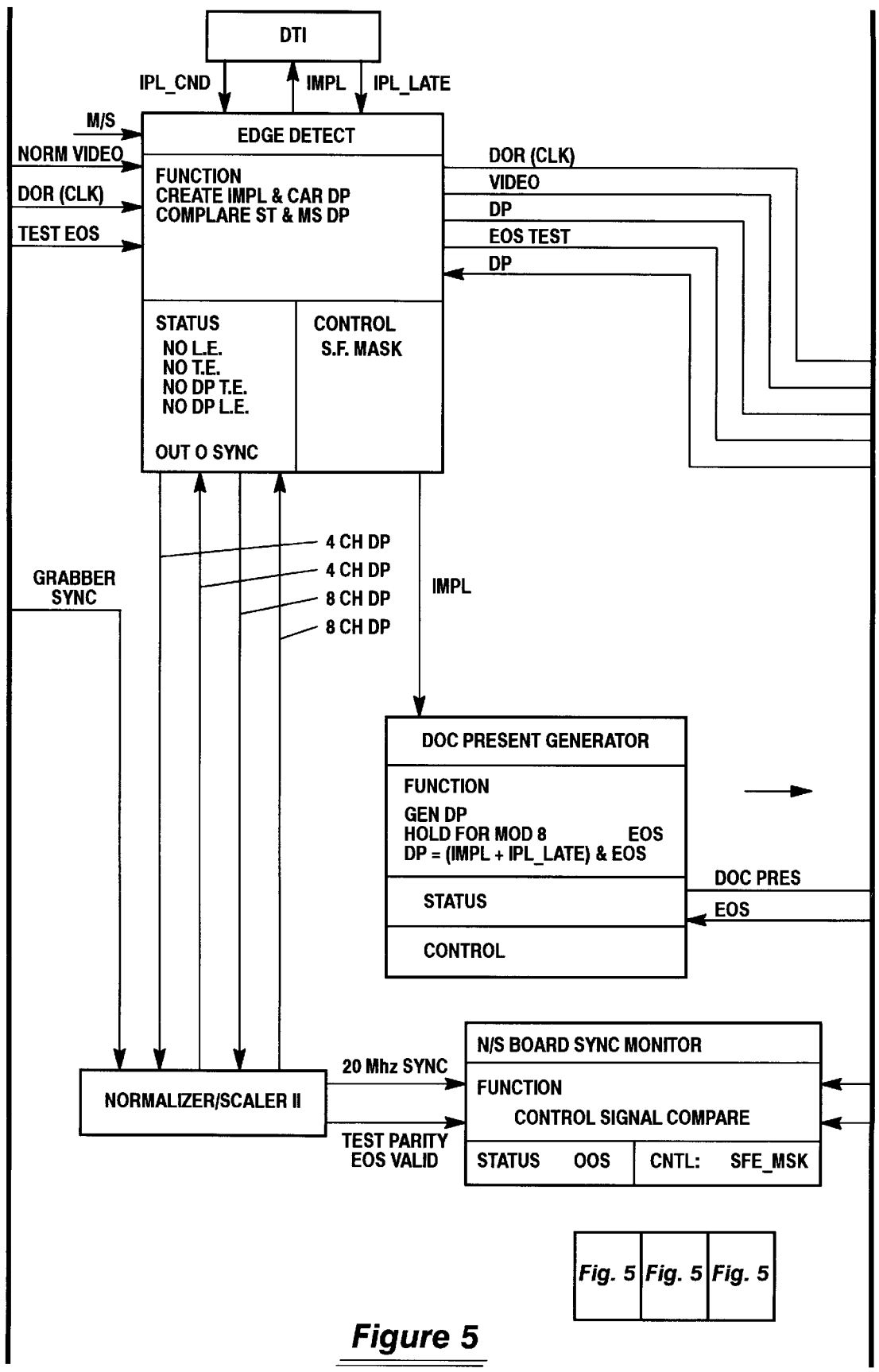
Figure 5:
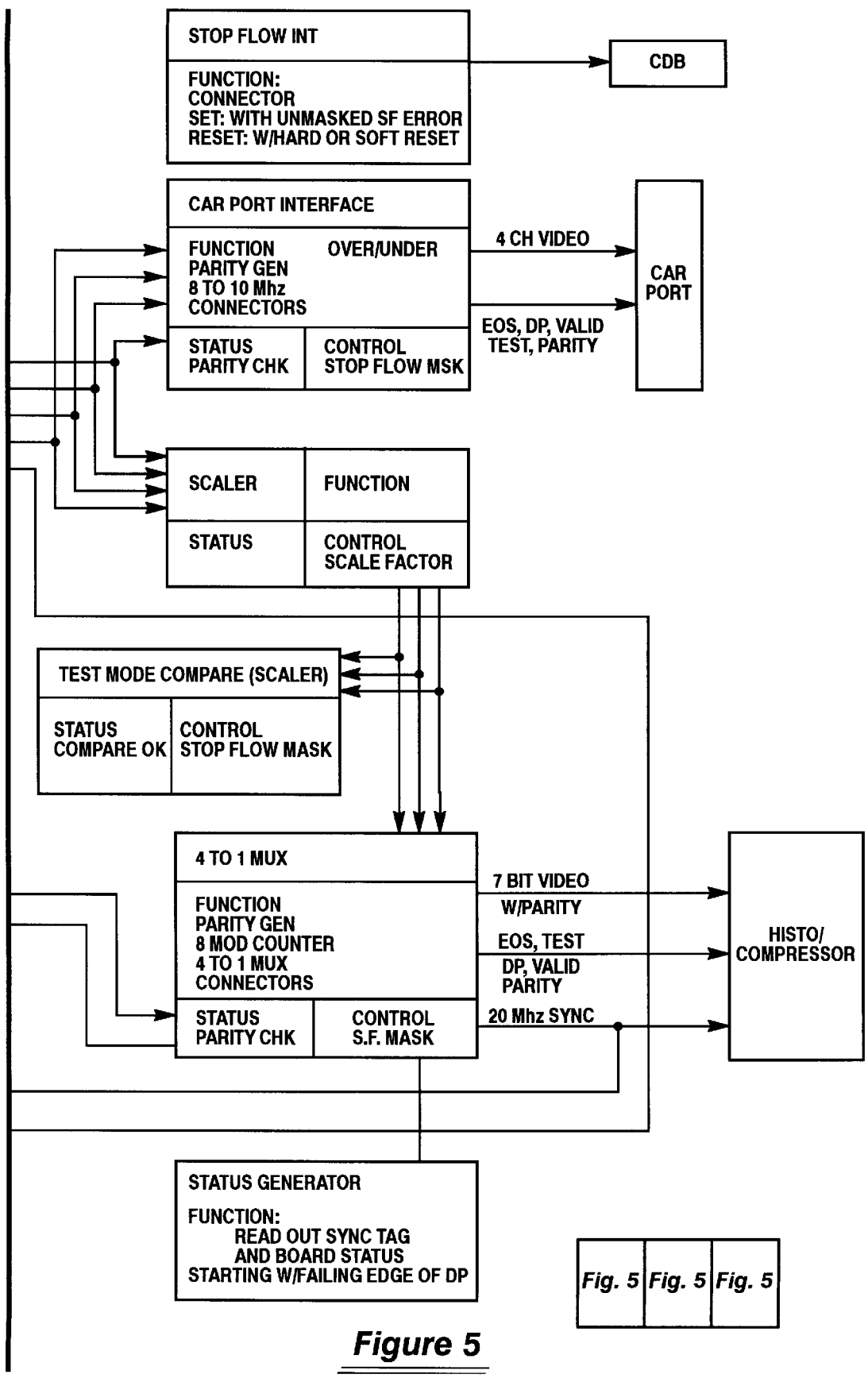

General Discussion:

Here, one may assume that there are eight channels of image data that need scaling for each document side (front, rear). We contemplate two NS (Normalizer/Scaler) boards to scale the eight channels; thus, each NS board will scale 4 channels of image data. Each channel of data is scaled independently by one of four image scaling circuits called "Scalers". (FIG. 5 depicts such an NS board in block diagram form; one such "Scaler" is depicted in FIG. 1.)

Image channel data will be understood as a collection of scan lines. Each scan line (e.g., see FIG. 4) makes up ⅛ of the total track image (top to bottom). If you place scanlines next to one another you will get a strip of image that is ⅛ of a track high and that extends lengthwise (e.g., to infinity).

Figure 4:
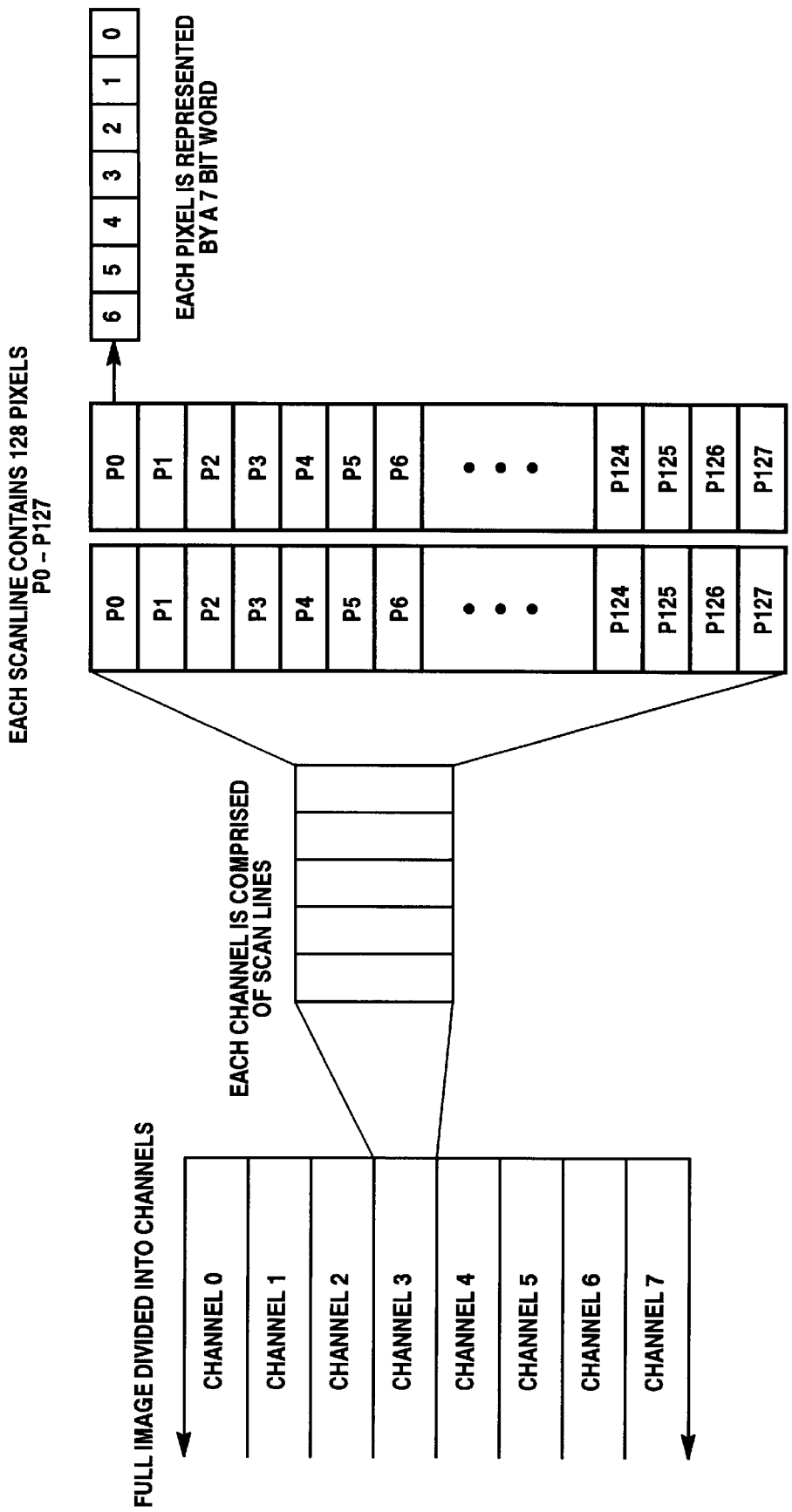

In FIG. 4, note where the full image is preferably divided into eight channels, with the scan-lines in each channel preferably comprised of 128 pixels, and each pixel represented by a 7-bit "word".

Each scan line is 128 pixels tall. Image data is fed into the scalers sequentially, starting with pixel 0 of the first scan line and ending with pixel 127. After pixel 127, the sequence begins again with pixel 0 of the next scan line, and so on.

The input data to the scalers therefore has a pattern like the following:

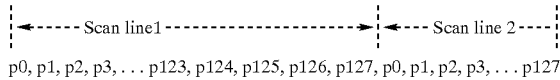

p0, p1, p2, p3, . . . p123, p124, p125, p126, p127, p0, p1, p2, p3, . . . p127

Resolution for such input data may be assumed as 200 pixels/inch of document. As it turns out, this resolution is too high, so one needs a means of reducing resolution without degrading image quality.

Reducing pixel resolution is the job of the subject "Mapping Scaler" (FIG. 1) on the NS board.

Scaler Operation:

The subject mapping scaler circuit (FIG. 1) performs a two-dimensional mapping of adjacent pixel values (document height) and adjacent scanline values (document length) to "new values" and adds valid/invalid markers. This "mapping" can reduce the image resolution from 200 dpi (dots per inch) to some lesser value. The scaler circuits preferably accomplish the mapping using "ROM Look-Up tables" (Scaler ROMs so coupled), that are arranged preferably in a pipeline architecture.

The ROM-based design means that all scaling calculations are performed ahead of time by the algorithm designer. Then the algorithm results are programmed into the scaler circuit ROMs (see R-1, R-2, R-3 in FIG. 2; R-4, -4', -5 in FIG. 3). The scaler circuits do not execute algorithmic calculations. The "new values" and valid/invalid markers come from the scaling algorithm results that are stored in the scaler ROMs. The scaler circuits "map" input values into the output algorithm results.

Since only the results of the scaling algorithm are needed, any adjacent pixel/adjacent scanline scaling algorithm that can be designed can be implemented in this design.

The scaling design according to this implemented feature can store eight (8) different scaling algorithms. Each algorithm is easily selected from the NS board's Command Register CR via a "scale factor" input (e.g., see Control Register CR in FIG. 5). Of course, using larger ROMs would allow for more stored algorithms.

Here, pipelined architecture means that, once the pipeline is full, the entire two-dimensional scaling function occurs in one clock cycle (tic). Therefore, scaling can occur in "real time" (at a desired 8 MHz rate).

Actual Scaling (Mapping):

The scaler circuits implement the scaling mapping in a pipeline fashion. The first Scaler stage S-I (FIGS. 1, 2) implements "adjacent pixel mapping" (document height).

Figure 2:
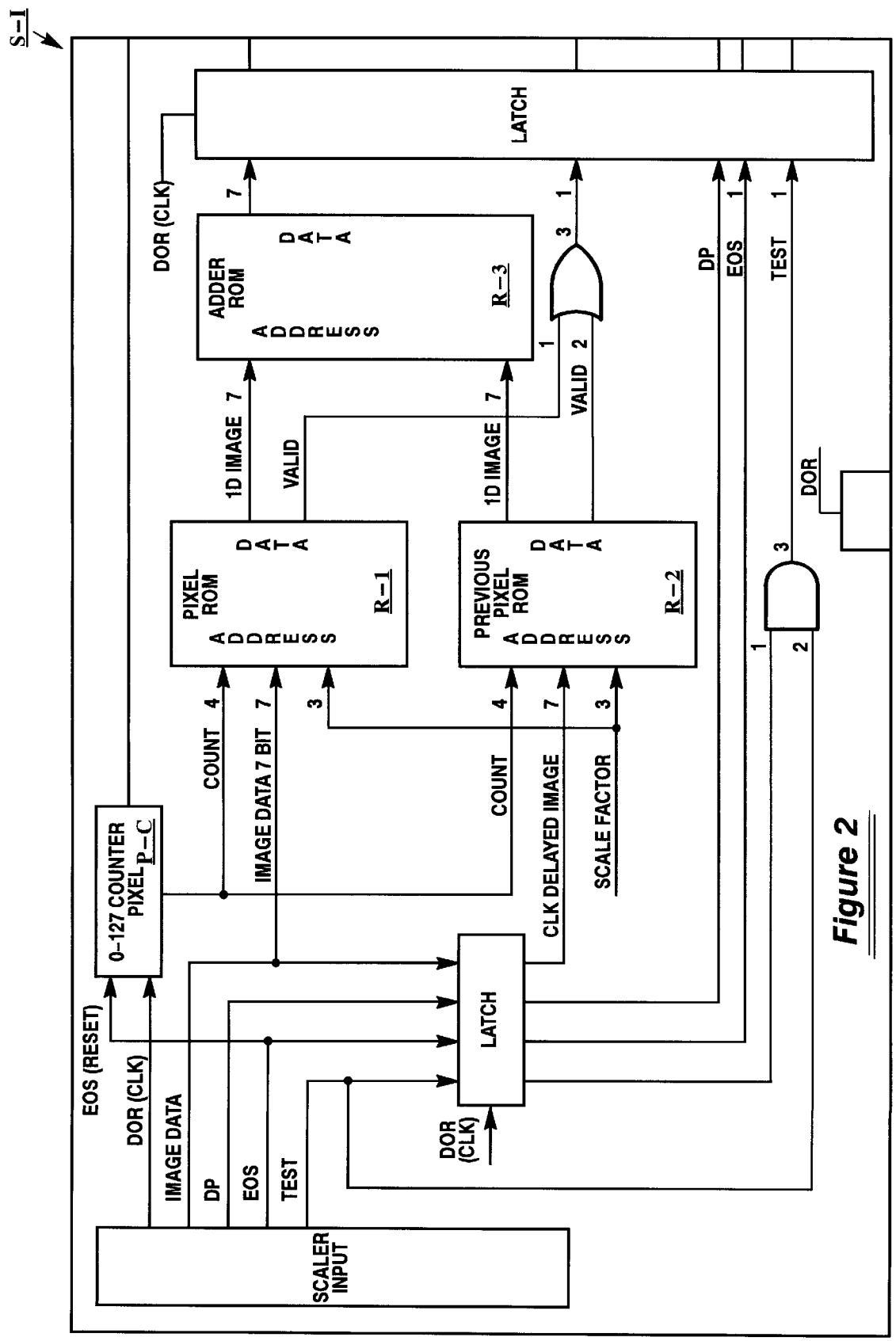
FIG. 2 is a like diagram of a First stage of FIG. 1
Figure 2A:
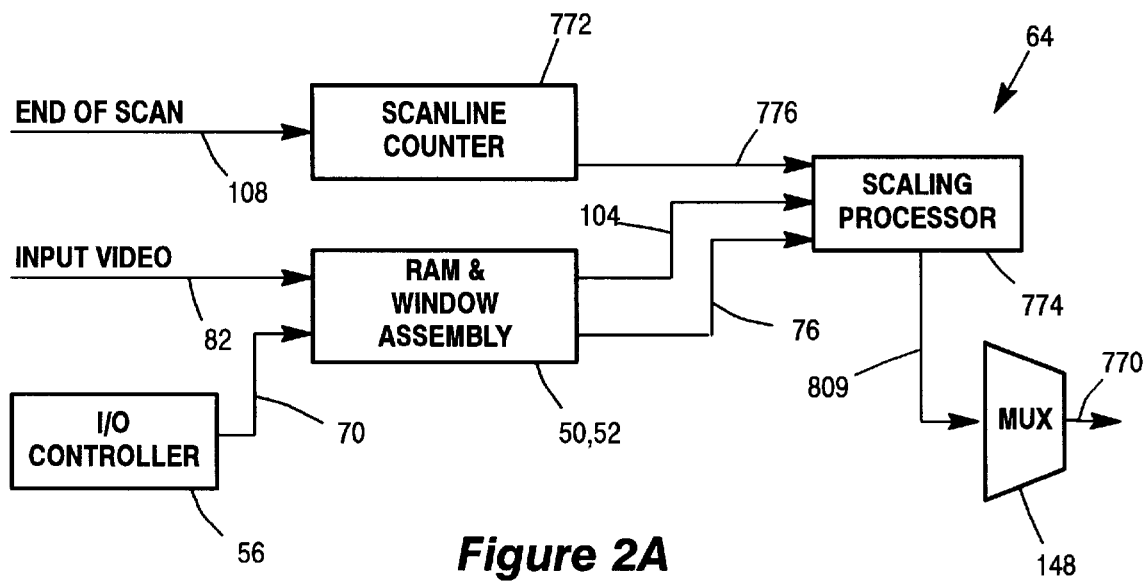

As one can see from FIG. 2, a "current" (7-bit) pixel value goes (from INPUT to R-1) to the pixel ROM address. The "previous" pixel value goes to the previous pixel ROM address R-2. In addition, each ROM address gets a pixel count number p-c and associated scale factor. The pixel count number p-c keeps track of which pixel one is working on. Pixel count is reset at the end of every scan by an "end of scan" (e-os) signal. A "scale factor" input selects which of the eight 8 possible scaling algorithm results is active.

Therefore, the ROM address contains the pixel value, pixel number, and scaling algorithm index. These three input values point (map) to a unique output data value and a valid "marker", depending upon the scaling algorithm (used to separate the result file). The data output from each ROM is then fed to the address of an Adder ROM (R-3) that performs the addition-mapping. (Or whatever other mapping that may be programmed into it.)

In general, "stage one" (S-I, FIGS. 1, 2) of this scaler does the following. Say we have an input data stream as follows:

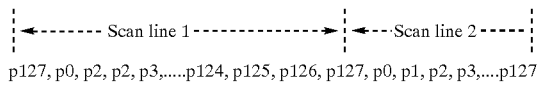

p127, p0, p2, p2, p3,.....p124, p125, p126, p127, p0, p1, p2, p3,....p127 p127 and p0 are mapped to—p0' and declared "valid" or "invalid"
p0 and p1 are mapped to—p1' and declared "valid" or "invalid"
p126 and p127 are mapped to—p127' and declared valid or invalid.

Then the entire sequence begins again.

The output data from stage one may now look like the following (possible 100 dpi scaling; notice the new values and valid/invalid markers "v,i"):

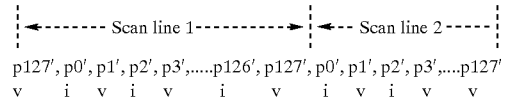

p127', p0', p1', p2', p3',.....p126', p127', p0', p1', p2', p3',....p127'
v    i   v   i         v     i     v    i   v    v

Where p' is the new mapped pixel value and ("i/v") denotes a valid or invalid marker.

Figure 3A:
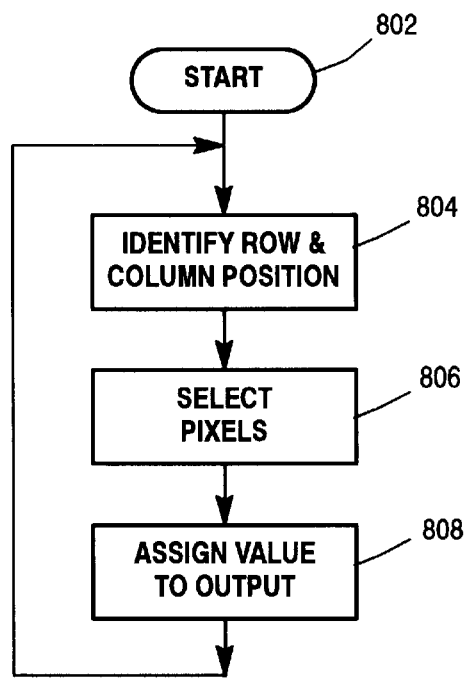
Figure 3:
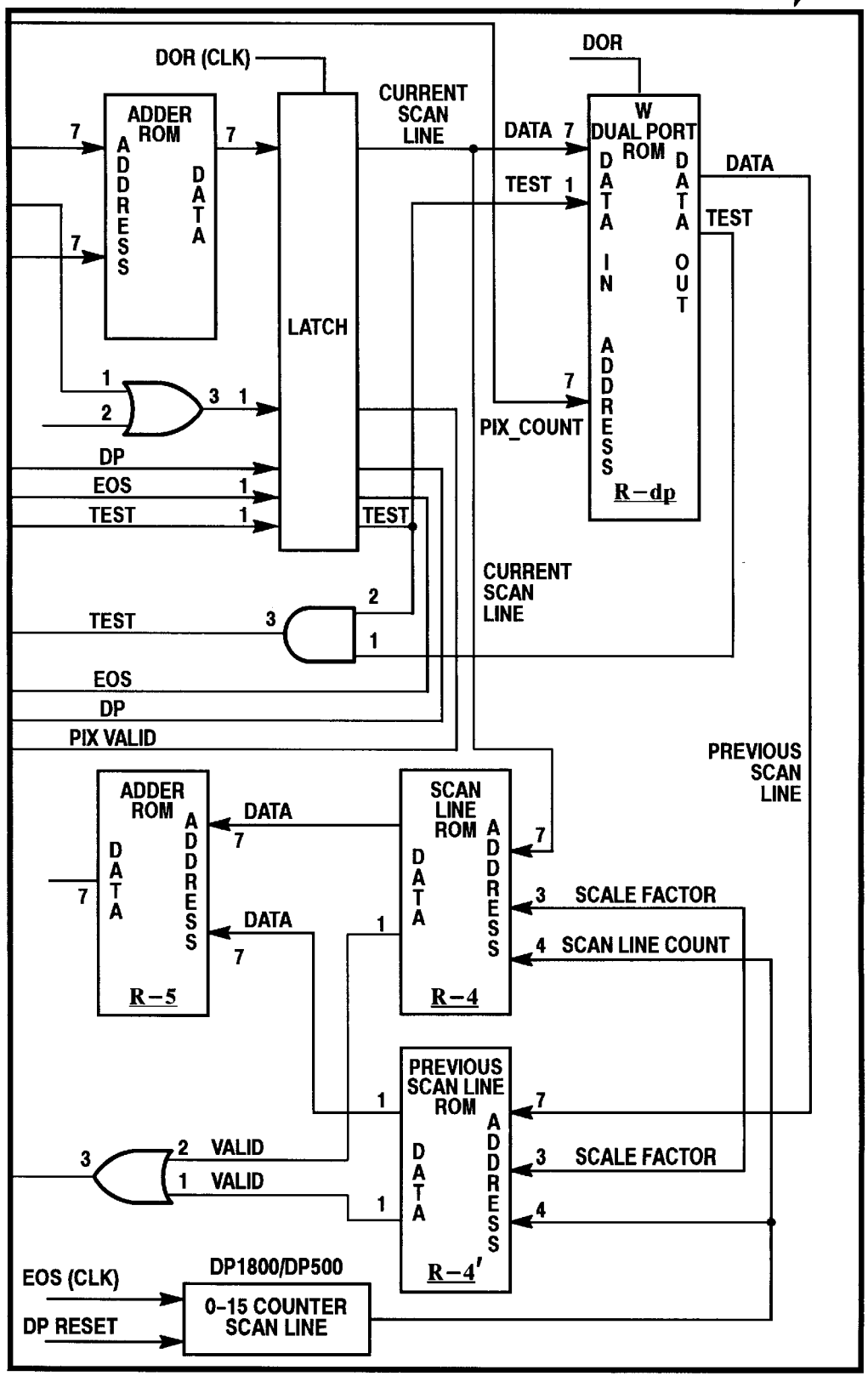
FIG. 3 is a like diagram of a Second stage of FIG. 1.

The next stage S-II (Stage Two, FIGS. 1, 3) of the scaler circuit maps pixel values from adjacent scan lines (document length; Note: FIG. 3 shows "dual port memory" and "adjacent scanline scaler").

To get at adjacent scan lines we need a place to store one complete scan line (so the previous scan line can be recovered on a pixel-by-pixel basis and mapped with pixels from the "current" scan line). For this storage function a dual-port RAM is preferred (e.g., see R-dp). For the dual-port RAM address, we use the pixel count. Now we can store the "current" scan line pixel, while recalling the previous scan line pixel in a single operation.

As one can see from FIG. 3, the "current" scan line pixel value is stored in a "Scan Line ROM" R-4, along with scale factor and scan line count. The previous scan line pixel value is stored in a "Previous Scan Line ROM" R-4', along with scale factor and scan line count.

Each ROM now has enough information (in the address) to "map" to a "new value" and a valid/invalid marker. The two "new values" are then fed to an Adder ROM R-5 for the addition function.

Therefore, if the output of the first stage (S-I) has the data pattern:

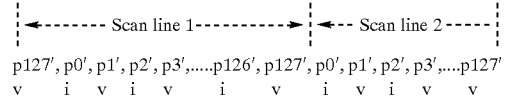

p127', p0', p1', p2', p3',.....p126', p127', p0', p1', p2', p3',....p127'
v    i   v   i         v     i     v    i   v    v

The data now looks like this at the R-5 output (possible 100 dpi scaling).

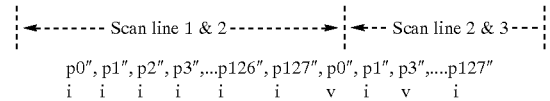

p0", p1", p2", p3",...p126", p127", p0", p1", p3",....p127"
i    i    i   i    i      i      v    i   v    i

The job is now complete. The output of the scaling circuits (S-OUT, FIG. 1) is a two-dimensional, scaled-down version of the input (S-IN). The scaled values and "valid" labels are dependent upon the scaling algorithm results stored in the scaler-ROMs. Pixels marked with "i" are invalid and are filtered-out of the data stream.

Scaler Features:

Multiple-scaling selections:

The described Scaler circuits preferably use a 4-bit pixel and 4-bit scanline counter (e.g., see counter PC in FIGS. 1, 2). Counter PC keeps track of pixel and scanline location within a 16-position window. Therefore, the scalers can implement any scaling algorithm that scales down the image by a multiple of 16. Possible scaling selections are $\frac{1}{16}$, $\frac{2}{16}$, $\frac{3}{16}$, $\frac{4}{16}$, $\frac{5}{16}$, $\frac{6}{16}$, $\frac{7}{16}$, $\frac{8}{16}$, $\frac{9}{16}$, $\frac{10}{16}$, $\frac{11}{16}$, $\frac{12}{16}$, $\frac{13}{16}$, $\frac{14}{16}$, $\frac{15}{16}$, $\frac{16}{16}$.

Of course, making the pixel and scanline counters larger would give more selections, 5 bits would give multiples of 32, 6 bits would give multiples of 64, etc.

Multiple-scaling algorithms:

The Scaler circuits preferably use a 3-bit "scale factor selection" code. This code allows 8 different scaling algorithms to be stored in the scaler ROMS simultaneously. Which scaling algorithm is run is determined by the 3-bit scale factor selection code. This code is accessed via the command register (CR, FIG. A-1) of the NS board. This selection code can activate different scaling factors such as 4/16 or 8/16; or it can activate different scaling algorithms such as 8/16 2×2 averaging or 8/16 bilinear interpolation, or whatever algorithm the designer wants to run; it is up to the algorithm designer and what he has programmed into the "Scaler ROMS" (e.g., see R-1, -2, -3, -4, -4', -5 in FIGS. 1, 2).

Asymmetric scaling:

Because adjacent pixel scaling (height) is handled independently of adjacent scanline scaling (length), it is possible to implement "asymmetric scaling". There is no reason why adjacent pixel scaling has to use the same scaling factor or scaling algorithm as adjacent scanline scaling. Example: adjacent pixel scaling (document height) might be 7/16 and adjacent scanline scaling (document length) might be 9/16. This particular example would have the visual effect of stretching the document length-wise. One can see how this option gives the algorithm designer extra flexibility in deciding how to scale documents.

Variations:

Workers will see that certain features hereof may be modified. For instance, note that it is possible to replace the mentioned three "S-I ROMS" (see FIG. 2: "Current pixel ROM" R-1, "previous pixel" ROM R-2, and "Adder ROM" R-3) with one large ROM.

Also, the three "S-II ROMs ("scanline" ROM R-3, "previous scanline" ROM R-4 and "adder" ROM R-5) can also be replaced with one large ROM.

Preferred implementation of the scalers allows for storage of eight separate scaling algorithm-mappings. This of course is limited only by the size of ROM selected. The design could use larger ROMs and so accommodate more scaling algorithm-mappings.

Results, Advantages:

Workers will appreciate that such a "mapping scaler" arrangement has several advantages (e.g., over the ASIC Scaler of U.S. Pat. No. 5,305,398, with its microprocessor-based single fixed scaling algorithm): e.g., the "Mapping Scaler" can provide more flexibility in storing, selecting, and running, new and different scaling algorithms; scaling algorithms, not currently stored, can be easily loaded by simply changing the circuit ROMs, with no hardware change required; it can implement asymmetric scaling.

Since these scaler circuits perform a mapping function rather than just implementing a scaling algorithm, any scaling algorithm that can be defined as a two-dimensional "adjacent pixel/adjacent scanline mapping" can be run; and asymmetric scaling can be implemented. [There is no reason why the scaling algorithm or scaling scale needs to be identical for adjacent pixel vs adjacent scanline scaling.]

Also, multiple algorithms (the instant NS scalers store 8) are stored and can be selected for use on an as-needed basis by a single instruction to the NS command register. (vs U.S. Pat. No. 5,305,398 which could run only one scaling algorithm.)

And multiple scaling mappings can be stored in the mapping ROMs, with these mappings selected by changing the ROM addressing via the scale factor input. (This current NS implementation stores 8 different scaling mappings.) The number of mappings stored is, of course, dependent on the size of the ROMs chosen. Larger ROMs would give space for more mappings.

Further, such scaler circuits can make use of dual port RAM for storage of a complete scanline for use in the adjacent scanline scaling. And since the scaler marks pixels as "valid" or "invalid", pixels marked invalid may be filtered-out of the data stream.

While the invention has been described in connection with the presently preferred embodiment, the principles of the invention are capable of modification and change without departing from the spirit of the invention as set forth in the appended claims.

What is claimed is:

1. An arrangement for extracting and processing single-bit or multi-bit image data to form an array of re-scaled pixel data, this arrangement being part of a Normalizer/Scaler stage in an image lift/processing system, and including:

flexible, variable scaler means for storing a number of different selectible scaling algorithms; scaler-output means; and input means for receiving scanned lines of pixel data and feeding it sequentially line-by-line, pixel-by-pixel to said scaler means; and input means also including "scale factors" for selecting a said algorithm; said scaler means including mapping means for executing a two-dimensional mapping of adjacent pixel values and adjacent scan line values; said arrangement also including command store means for storing said scaling algorithms with a command register input for said scale factors;

wherein said scaler means also includes a First ROM R-1 input by said input means for storing pixel values at prescribed addresses; a Second ROM R-2 for similarly storing previous pixel values, being input in parallel with First ROM R-1; Latch means to which said ROMs are output; and pixel Count means reset with each new scan line;

wherein a "current pixel" value is input to a prescribed address in said First ROM, along with a "pixel count" number from said Count means, and an associated scale factor; and wherein Adder means is interposed between said ROMs and said Latch means to execute addition mapping.

2. The invention of claim 1, wherein said mapping means adds "valid/invalid" markers, whereby said output means is arranged to block values with invalid markers.

3. The invention of claim 1, wherein said mapping uses "valid/invalid" marker bits.

4. An arrangement for extracting and processing image data to form an array of re-scaled pixel data, this arrangement including:

scaler means; scaler-output means; and input means for receiving scanned lines of pixel data and feeding it sequentially line-by-line, pixel-by-pixel to said scaler means; said scaler means including mapping means for executing a two-dimensional mapping of adjacent pixel values and adjacent scan line values;

wherein said scaler means also includes a First ROM R-1 input by said input means for storing pixel values at prescribed addresses; a Second ROM R-2 for similarly storing previous pixel values, being input in parallel with first ROM R-1; Latch means to which said ROMs are output; and pixel Count means reset with each new scan line;

wherein a "current pixel value" is input to a prescribed address in said first ROM, along with a "pixel count" number from said Count means, and an associated scale factor whereby out-pixel count will not exceed in-pixel count; and wherein Adder means is interposed between said ROMs and said Latch means to execute addition mapping.

5. The invention of claim 4, wherein said scaler means stores selectible scaling algorithms.

6. The invention of claim 5, wherein said arrangement includes command store means for storing said scaling algorithms, and said input means includes "scale factors" for selecting a said algorithm.

7. The invention of claim 6, wherein said store means comprises a command register input by said scale factors.

8. The invention of claim 7, wherein this arrangement is part of a Normalizer/Scaler stage in an image lift/processing system.

9. The invention of claim 4, wherein are included Line-store means for storing a complete scan line and associated means for comparing with prior pixel values to develop "new" pixel values and to output that, with a valid/invalid marker, to Output-Adder means and thence to Scale-output means.

10. The invention of claim 9, wherein said Line-store means comprises a dual-port RAM, feeding a Scan-line ROM means and a previous Scan-line ROM means, each storing pixel value, scale factor and scan-line count, with both ROM means input to said Output-Adder means.

11. An image processing system with image revising means comprising:
image sensor means for scanning a target image and generating "original" single-bit or multi-bit pixel data;
first input means for receiving said pixel data generated from said image sensor means;
plus output means registering re-scaled "new" pixel data in terms of rows and columns of the scanned image, as new output pixel data; and
flexible, variable scaling processor means coupled to input said output means and operative to create a "new scaled" second array of pixel data by combining pixel values in a predetermined manner, to thereby re-scale the original pixel values;
wherein said scaler processor means includes a first ROM R-1 input by said input means for storing pixel values at prescribed addresses; a Second ROM R-2 for similarly storing previous pixel values, being input in paralleled with First ROM R-1; Latch means to which said ROMs are output; and pixel Count means reset with each new scanline;
wherein a "current pixel value" is input to a prescribed address in said First ROM, along with a "pixel count" number from said Count means, and an associated scale factor; and wherein Adder means is interposed between said ROMs and said latch means to execute addition mapping and assure that out-pixels do not exceed in-pixels.

12. The system of claim 11, wherein said revising means further comprises:
second input means for receiving "end of scan line" signals, each indicating an end of a scan line of said image sensor;
memory means for storing the pixel data;
address generator means for generating an address for each pixel in a scan line; and
counter means for identifying said "end of scan line" signals and applying them to steer the placement of each of said pixels within said image data.

13. An arrangement for scaling-down single-bit or multi-bit image data corresponding to a captured image, this arrangement comprising:
imaging means for generating a first array of single-bit or multi-bit original-pixel values in rows and columns; and
flexible, variable scaler means including means for mapping and revising said first array of pixel values in a pre-determined manner to scale-down the original pixel values from the captured image;
wherein said scaler means includes a first ROM-R-1 input by said input means for storing image data pixel values at prescribed addresses; a Second ROM R-2 for similarly storing previous pixel values, being input in parallel with First ROM R-1; latch means to which said ROMs are output; and
pixel count means reset with each new scan line;
wherein a "current pixel value" is input to a prescribed address in said first ROM, along with a "pixel count" number from said Count means plus means to assure that out-pixels do not exceed in-pixels;
wherein Adder means is interposed between said ROMs and said latch means to execute addition mapping.

14. The invention of claim 13, wherein said mapping means includes special mapping memory.

15. The invention of claim 14, wherein said scaling accommodates any two-dimensional, adjacent-pixel pattern and is not hard-wired.

* * * * *